United States Patent [19]

Clarke

[11] 4,200,181

[45] Apr. 29, 1980

[54] CONVEYOR SYSTEMS FOR CIGARETTES AND SIMILAR ROD-LIKE ARTICLES

[75] Inventor: Peter A. Clarke, London, England

[73] Assignee: Molins Limited, England

[21] Appl. No.: 685,535

[22] Filed: May 11, 1976

[30] Foreign Application Priority Data

May 16, 1975 [GB] United Kingdom ............... 20962/75

[51] Int. Cl.² ............................................. B65G 43/08
[52] U.S. Cl. .................................. 198/572; 198/347; 198/575
[58] Field of Search ........ 198/347, 358, 502, 571–573, 198/575, 577, 810, 855–857, 604, 606, 607, 626; 131/21 R, 21 B, 21 C; 271/262, 263; 214/17 CA; 414/294, 296

[56] References Cited

U.S. PATENT DOCUMENTS

| | | | |
|---|---|---|---|
| 2,438,068 | 3/1948 | Mercier | 198/813 |
| 2,907,450 | 10/1959 | Reid | 198/810 |
| 3,605,989 | 9/1971 | McCombie | 198/573 |
| 3,921,790 | 11/1975 | Hinchcliffe et al. | 198/577 |

*Primary Examiner*—Joseph E. Valenza
*Attorney, Agent, or Firm*—Craig and Antonelli

[57] ABSTRACT

A conveyor system for cigarettes includes means defining a junction zone, at least two conveyors each having one end adjacent to the junction zone and arranged to carry cigarettes into or from the junction zone, and a moving sensor band which has an operative section partly defining the junction zone and capable of flexing outwards, against a tensioning force, under the pressure of cigarettes in the junction zone, the sensor band being driven so as to assist the movement of cigarettes through the junction zone.

15 Claims, 6 Drawing Figures

CONVEYOR SYSTEMS FOR CIGARETTES AND SIMILAR ROD-LIKE ARTICLES

This invention is concerned with various systems for conveying cigarettes or similar rod-like articles. For convenience, however, the invention will be described with reference only to cigarettes.

A conveyor system according to this invention includes at least two conveyors each having one end adjacent to a junction zone and arranged to carry cigarettes into or from the junction zone (either unidirectionally or reversibly), and a moving sensor band which has an operative section partly defining the junction zone and capable of flexing outwards, against a tensioning force, under the pressure of cigarettes in the junction zone, the sensor band being driven (not necessarily continuously) so as to assist the movement of cigarettes through the junction zone.

The system preferably includes monitoring means responsive to the amount of outward flexing of the operative section of the sensor band to control the speed and possibly the direction of motion of one of the conveyors.

The speed of the sensor band may be fixed or may be varied in response to the monitoring means.

The monitoring means may comprise a spring-loaded pulley around which the sensor band passes, outward flexing of the operative section of the sensor band being resisted by the spring, (which provides the tensioning force), and movement of the spring-loaded pulley being used as an indication of the amount of the flexing of the band. The pulley may, for example, be mounted on a pivoted lever which is coupled to a speed-regulating device.

As an alternative, outward flexing of the operative section of the band, or flexing of another section of the band, or movement of the outer surface of the cigarettes adjacent to the band, may be monitored by a position transducer. In one possible arrangement, in which the sensor band lies above the junction zone, the band comprises two laterally spaced portions, the height of the mass of cigarettes in the junction zone being monitored by a position transducer mounted above the space between the band portions so that the transducer responds to the cigarettes and not to the band portions. The cigarettes may at times be out of contact with the sensor band, and may make contact with the band only when the delivery of cigarettes from the junction zone begins to be less than the supply of cigarettes into the junction zone; when such a supply and delivery condition arises, the cigarettes push against the operative section of the sensor band, flexing it outwards, and contact with the band then helps drive the cigarettes forwards from the junction zone. Alternatively, the cigarettes may be in contact with the band substantially all the time; when the part of the band contacting the cigarettes is nearly straight (i.e. is only slightly flexed by the cigarettes), the distance of the cigarettes from the position transducer produces a control signal at one extreme, and maximum flexure of the band by the cigarettes (bringing the cigarettes closer to the transducer) produces a control signal at the other extreme. The two extremes may produce maximum conveyor speeds in opposite directions; alternatively, if the controlled conveyor is unidirectional, one extreme may be zero speed.

Examples of conveyor systems according to this invention are shown in the accompanying drawings. In these drawings.

Figure 1:
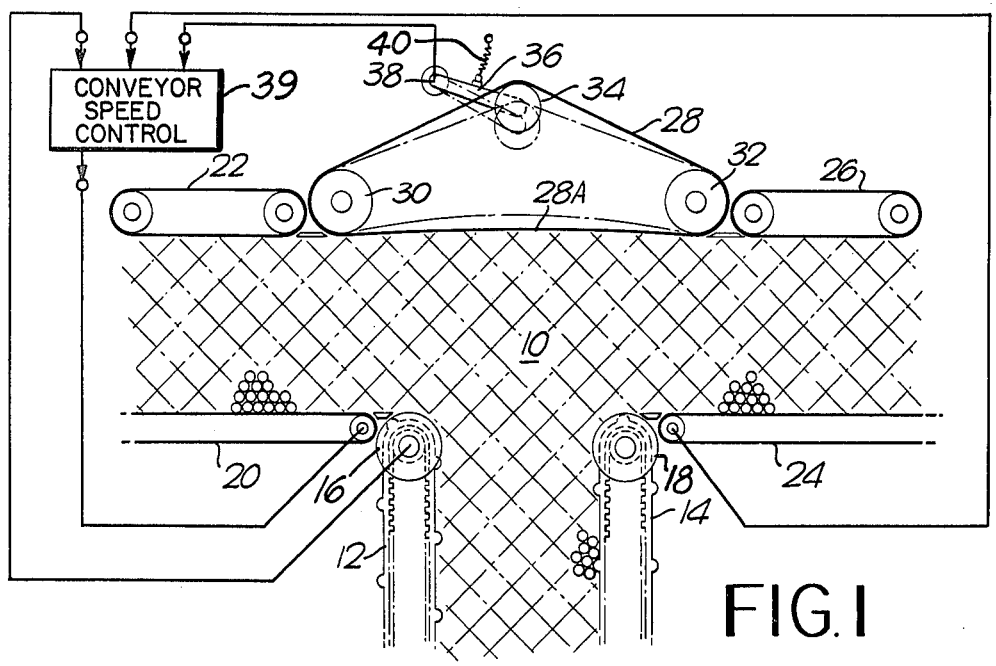
FIG. 1 shows part of one conveyor system including a junction between three conveyors.

The conveyor system shown in FIG. 1 includes a junction zone 10 and three conveyors having ends adjacent to the junction zone. One of the conveyors comprises bands 12 and 14 forming a vertical feed; the bands pass around pulleys 16 and 18 adjacent to the junction zone, the construction being in accordance with the invention described in patent application Ser. No. 408,256 filed Oct. 23, 1973 (and corresponding German OS No. 2,353,806). The second conveyor meeting at the junction 10 comprises a horizontal band 20 with a co-operating top band 22 which always runs at the same speed and in the same direction as the band 20; i.e. the band 22 runs in unison with the band 20. The third conveyor comprises a horizontal band 24 with a co-operating top band 26 which runs in unison with the band 24.

Above the junction zone 10 there is a sensor band 28 which has an operative section 28A arranged to contact the cigarettes in the junction zone 10. The band 28 passes around pulleys 30 and 32 which rotate about fixed axes, and around a spring-loaded pulley 34 mounted on a lever 36 pivoted at 38, the lever 36 being urged in a counter-clockwise direction about the pivot 38 by a spring 40. Thus the spring-loaded pulley 34 keeps the band 28 in tension.

The operative section 28A of the band 28 is shown in solid outline at approximately its lowermost position, in which it is slightly flexed by the pressure of cigarettes so as to present a concave surface to the cigarettes in the junction zone 10. When the pressure of the cigarettes on the band 28 increases, the band is deflected further upwards, against the resistance of the spring 40, and the spring-loaded pulley 34 moves correspondingly downwards and rotates the lever about the pivot 38.

The pivot 38 may comprise a spindle which is coupled to a speed-regulating mechanism 39 arranged to control the speed of one of the conveyors, such as the conveyor comprising the bands 20 and 22.

The system shown in FIG. 1 may be used in various modes of operation. One mode of operation is as described in the above-mentioned patent application. That is to say, the conveyor 20, 22 receives a stack-like stream of cigarettes from one or more cigarette making machines and conveys the cigarettes to the junction zone 10. The conveyor 24, 26 carries a stack of cigarettes from the junction zone 10 and towards one or more cigarette packing machines. When supply of cigarettes into the junction zone exceeds demand, the vertical feed 12, 14 conveys cigarettes downwards at an appropriate speed (which is controlled by the sensor band 28) to a reservoir unit (not shown). On the other hand, when demand exceeds supply, the vertical feed 12, 14 delivers cigarettes upwards into the junction zone 10 from the reservoir unit.

In this first mode of operation, the band 28 is preferably driven continuously in the same direction, i.e. so that the operative section 28A moves to the right. The speed of the band may be constant; another possibility is that the speed may be varied in accordance with, or in direct proportion to, the speed of the conveyor 24, 26.

Another mode of operation of the system shown in FIG. 1 is as follows. The vertical feed 12, 14 feeds cigarettes continuously upwards from a cigarette making machine; the conveyor 24, 26 carries cigarettes from the junction zone 10 to one or more packing machines when delivery is required; and the conveyor 20, 22 carries cigarettes to or from a reservoir unit, for example that described in British patent specification No. 1,299,174 (see particularly FIGS. 1 and 2).

In this mode of operation the band 28 is preferably reversible. Its drive may, for example, be linked to that of the conveyor 20, 22 so that its speed and direction of movement corresponds to that of the conveyor 20, 22. Another possibility is that the system may have a control circuit whereby the operative section 28A of the band moves to the right as long as the conveyor 24, 26 is carrying cigarettes from the junction zone 10, and moves to the left when the conveyor 24, 26 stops (i.e. when the associated packing machine is temporarily inoperative) to assist in driving cigarettes onto the conveyor 20, 22 and from there into the reservoir; the speed of the band 28 in opposite directions may be the same. In each case the speed of the conveyor 24, 26 may be set by a sensor at the downstream end of the conveyor 24, 26 in accordance with the demand for cigarettes by the packing machine. The upward speed of the vertical feed 12, 14 may be constant or may be set by a sensor at the lower end of the vertical feed in the region where the row of cigarettes delivered by the cigarette making machine is formed into a stack.

In the second mode of operation of the system shown in FIG. 1, the control circuit may be arranged to set the speed of the conveyor 20, 22 (and also its direction of movement) at an approximately predetermined value depending upon the speeds of the conveyors 12, 14 and 24, 26. That is to say, the control circuit may basically determine the speed and direction of the conveyor 20, 22 to feed cigarettes at a rate appropriate to the supply and demand condition at the junction zone 10. However, the speed of the conveyor 20, 22, would be subject to slight alterations in response to the sensor band 28. Similar considerations may apply to the first mode of operation.

Figure 2:
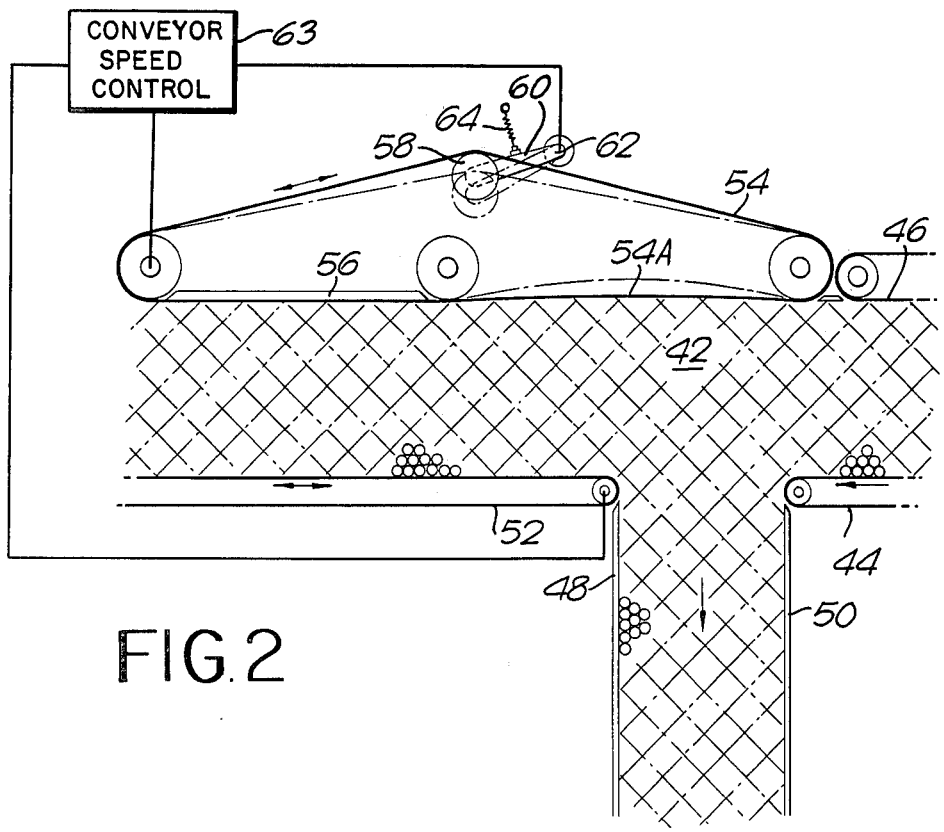
FIG. 2 shows a modification of the system shown in FIG. 1.

FIG. 2 shows a different form of junction. In this example, a stack-like stream of cigarettes is carried towards a junction zone 42 by a conveyor 44, 46 which moves always in the direction shown, the conveyor 44, 46 being arranged for example to receive cigarettes from a cigarette making machine. A chute comprising walls 48, 50 extends downwards from the junction 42 to deliver cigarettes to a packing machine; and differences between supply and demand at the junction 42 are taken into account by a reversible conveyor 52 leading to a reservoir, again for example as described in British patent specification No. 1,299,174.

In this system there is a sensor band 54 which has an operative lower section 54A extending across the top of the junction zone 42 and also below a fixed plate 56. The part of the band 54 extending below the plate 56 co-operates with the conveyor 52 to define the height of the stack of cigarettes on the conveyor 52, the speed and direction of the band 54 being equal to that of the conveyor 52. As in the system shown in FIG. 1, the band 54 is held in tension by a spring-loaded pulley 58. The pulley is mounted on a lever 60 which is pivoted at 62 and is urged in a clockwise direction by a spring 64. Movement of the lever about the pivot 62 is arranged to control a mechanism 63 which regulates the speed and direction of movement of the conveyor 52 and also of the band 54.

Figure 3:
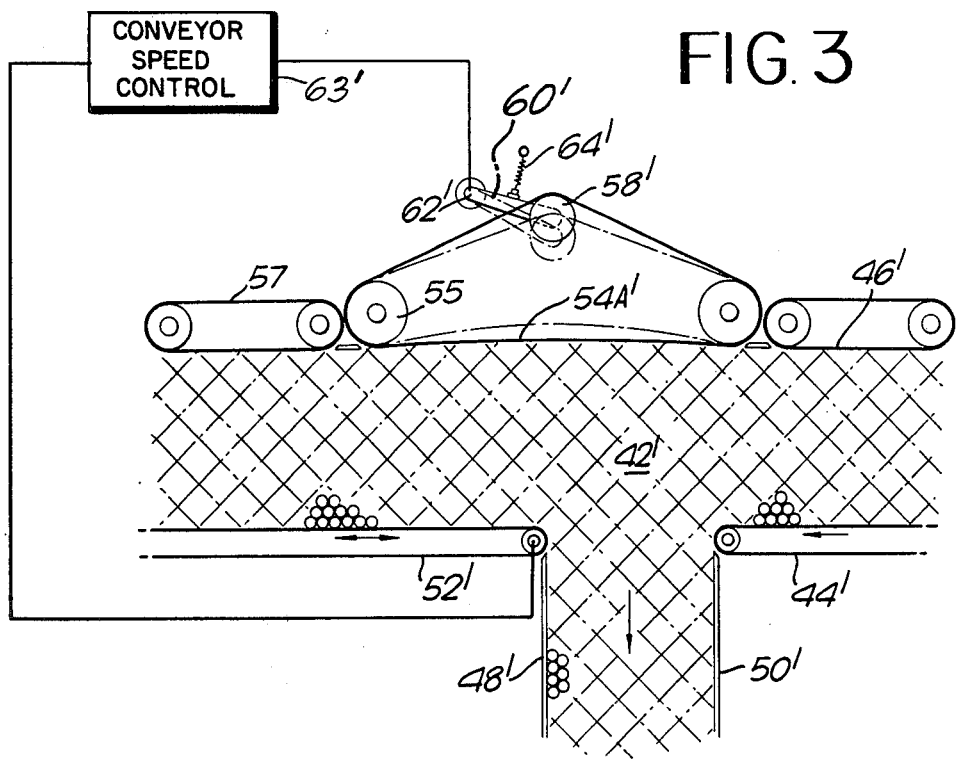
FIG. 3 shows another modification of the system shown in FIG. 1.

FIG. 3 is a modification of the system shown in FIG. 2, similar or equivalent parts having the same reference numeral with an additional dash. Instead of the sensor band 54A' extending below a plate 56 (as in FIG. 2) to define the upper surface of the stack on the conveyor 52', it returns around a pulley 55, and there is an additional top band 57 which moves in unison with the conveyor 52'.

Movement of the sensor band 54A' may be controlled so that, when both conveyors 44' and 52' are feeding cigarettes into the junction, the band 54A' is stopped.

In FIGS. 2 and 3 the chute may be replaced by a reversible vertical feed as in FIG. 1.

Figure 4:
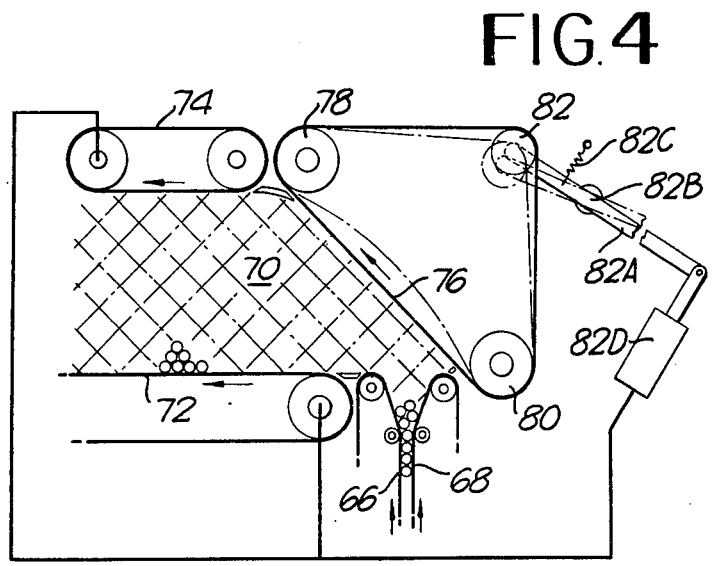
FIG. 4 shows another system including a junction of two conveyors.

FIG. 4 shows another different system. A single row of cigarettes is fed upwards between conveyor bands 66 and 68 into a junction zone 70, the bands 66 and 68 being constrained, for example, to move upwards along a sinuous path to grip the cigarettes between them as described with reference to FIGS. 3, 6 and 7 of British patent specification No. 1,299,174. The single-row stream of cigarettes is formed into a stack-like stream in the junction zone 70, and the stack is carried away by a conveyor 72 with a co-operating top band 74 which moves in unison with the band 72 and maintains the height of the stack on the conveyor 72. A sensor band 76, which controls the speed of the conveyor 72, 74, passes around fixed pulleys 78 and 80 and around a spring-loaded pulley 82; the pulley 82 is mounted on a lever 82A which is urged clockwise about a pivot 82B by a spring 82C. Movement of the pulley 82 operates a speed regulating device 82D which controls the speed of the conveyor 72, 74. The sensor band 76 may obtain its drive from that of the conveyor 72, 74 so as to run at a speed equal to, or in proportion to, that of the conveyor 72, 74; for example, the band 76 may run at a higher speed than the conveyor 72, 74.

Figure 5:
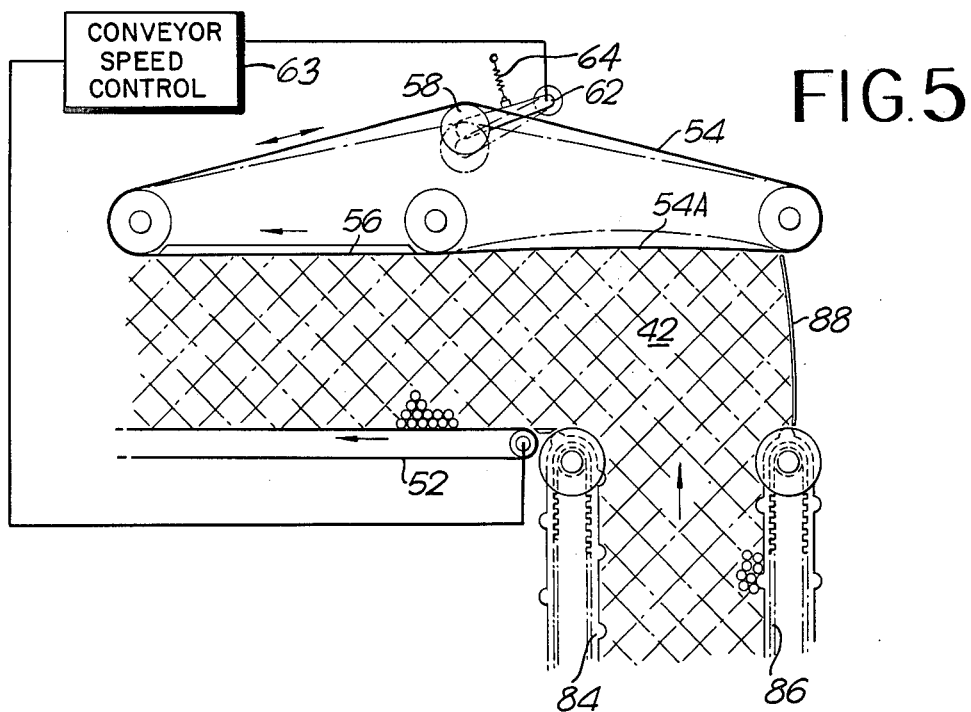
FIG. 5 shows a modification of the system shown in FIG. 4.
Figure 6:
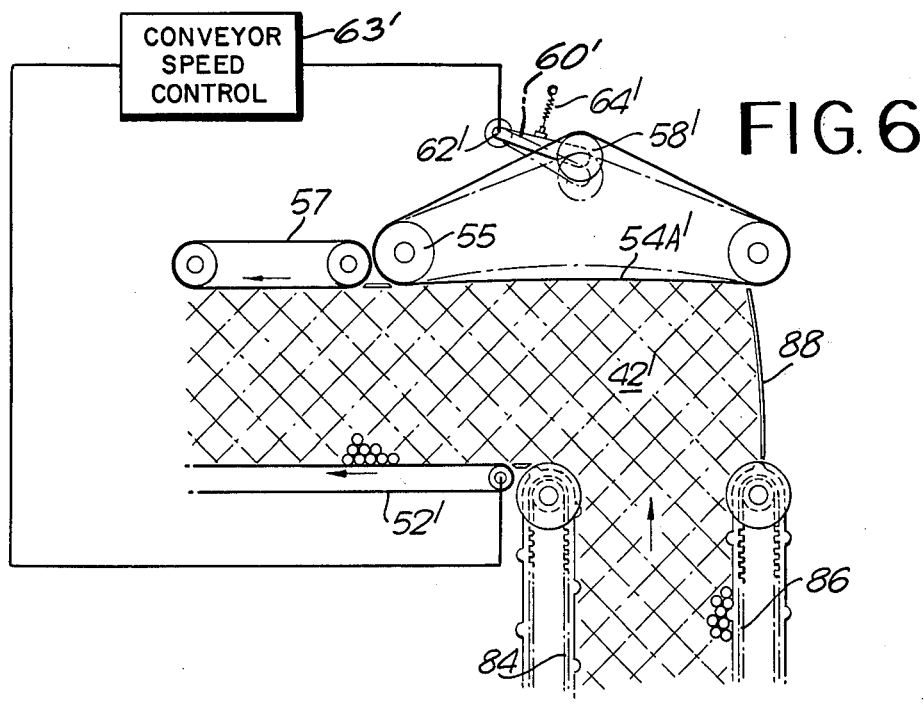
FIG. 6 shows another modification of the system shown in FIG. 4.

FIGS. 5 and 6 show a different way of producing a stack of cigarettes on an overhead conveyor. In each example, the cigarettes are fed upwards as a stack by means of a vertical feed comprising ribbed conveyor bands 84, 85 as described with reference to FIG. 1. At the top of the vertical feed there is an assembly which is basically like those shown in FIGS. 2 and 3 respectively, as shown by the use of the same reference numerals. Each assembly or "head unit" is completed by a fixed plate 88. Movement of the spring-loaded pulley 58 or 58' controls the speed of the conveyor 52 or 52', 57.

The vertical feed and overhead conveyor (52, 52') may operate unidirectionally (as shown) or reversibly.

I claim:

1. A conveyor system for cigarettes, including means defining a junction zone, at least two conveyors each having one end adjacent to the junction zone and arranged to carry cigarettes into or from the junction zone, a moving sensor band which has an operative section partly defining the junction zone, support means for supporting said sensor band with a predetermined tensioning force so as to be capable of flexing outwardly of the junction zone against said tensioning force under the pressure of cigarettes in the junction zone, the sensor band being driven so as to assist the movement of cigarettes through the junction zone, and monitoring means responsive to the amount of outward flexing of the operative section of the sensor band for controlling the speed and/or direction of movement of one of the conveyors, the monitoring means comprising a movable pulley around which the sensor band passes, means for urging the movable pulley in a direction such as to tension the operative section of the sensor band on said support means so as to apply said tensioning force thereto, and means responsive to movement of the pulley for controlling the speed and/or direction of movement of one of the conveyors.

2. A conveyor system according to claim 1, in which the movable pulley is mounted on a pivoted lever which is acted upon by a spring to urge the pulley in the desired direction.

3. A conveyor system according to claim 1 in which the sensor band passes around at least two fixed pulleys adjacent to the junction zone comprising said support means, in addition to passing around the movable pulley.

4. A conveyor system according to claim 1, in which a section of the sensor band passes below a fixed plate.

5. A conveyor system according to claim 1 so arranged that the speed at which the sensor band moves, while it is being driven, is related to the speed at which one of the conveyors is driven.

6. A conveyor system according to claim 1, in which three conveyors meet at the junction zone, one being a substantially vertical conveyor and the other two being substantially horizontal.

7. A conveyor system according to claim 1, in which one of the conveyors is driven at a speed which is basically related to the speed of the other conveyor or conveyors but is varied slightly by the monitoring means.

8. A sensing unit for use in a cigarette conveyor system at a junction between at least two conveyors, comprising a moving sensor band arranged to pass around two fixed pulleys and around a movable pulley which is urged in a direction such as to tension the band, and including a conveyor speed regulating device coupled to the movable pulley to control the speed of a conveyor in response to pressure of cigarettes, during use, on the section of the band passing directly between the two fixed pulleys.

9. A conveyor system for cigarettes, including means defining a junction zone, at least two conveyors each having one end adjacent to the junction zone, a sensor band which has an operative section partly defining the junction zone, support means for supporting said sensor band with a predetermined tensioning force so as to be capable of flexing outwardly of the junction against said tensioning force under the pressure of cigarettes in the junction zone, and monitoring means cooperating with a portion of the band remote from the operative section thereof so as to respond to shortening of the said remote portion of the band caused by flexing of the operative section, for controlling the speed and/or direction of movement of one of the conveyors.

10. A conveyor system according to claim 9 in which the sensor band comprises an endless band which is driven to assist movement of cigarettes through the junction and passes around a pair of spaced-apart guide means forming part of said support means and defining the said operative section.

11. A conveyor system according to claim 10 in which said support means includes a movable pulley around which the sensor band passes and means for urging the movable pulley in a direction such as to tension the sensor band, said monitoring means being responsive to movement of the pulley.

12. A conveyor system according to claim 10 in which each guide means comprises a fixed pulley.

13. A conveyor system for cigarettes and similar rod-like articles, comprising means defining a junction; a first conveyor for feeding cigarettes into the junction at a variable rate; a second conveyor for feeding cigarettes from the junction; means for detecting the relative rates at which cigarettes are being fed into and from the junction by said first and second conveyors; a reversible third conveyor for feeding cigarettes selectively into or out of the junction at a variable rate; means controlling the direction of the third conveyor in accordance with whether said detecting means indicates that the feed rate of the first conveyor is greater or less than the feed rate of the second conveyor; a sensor associated with the junction and responsive to the volume or pressure of cigarettes in the junction; and speed regulating means responsive to the sensor for controlling the speed of the third conveyor.

14. A conveyor system for cigarettes and similar rod-like articles, comprising means defining a junction; a first conveyor for feeding a stack of cigarettes into the junction at a variable rate; a second conveyor for feeding cigarettes from the junction, means for indicating the speed of the first and second conveyors, as an indication of the feed rate of said conveyors; a reversible third conveyor for feeding cigarettes selectively into or out of the junction at a variable rate; means controlling the direction of the third conveyor in accordance with whether said indicating means indicates that the feed rate of the first conveyor is greater or less than the feed rate of the second conveyor; a sensor associated with the junction and responsive to the volume or pressure of cigarettes in the junction; and speed regulating means responsive to the sensor for controlling the speed of the third conveyor.

15. A conveyor system for cigarettes and similar rod-like articles, comprising means defining a junction; a first conveyor for feeding a stack of cigarettes into the junction at a randomly variable rate; including means for indicating the rate at which cigarettes are being fed into the junction by the first conveyor; a second conveyor for feeding a stack of cigarettes into or from the junction; a third conveyor for feeding a stack of cigarettes from the junction; speed control means responsive to the indicating means for controlling the speed of the second conveyor to achieve an approximate flow balance at the junction zone as between the feed of cigarettes respectively into and out of the junction; a sensor associated with the junction and responsive to the volume or pressure of cigarettes in the junction; and speed regulating means responsive to the sensor for superimposing a speed control on the speed control means for fine balance of the cigarette flow into and out of the junction.

* * * * *